June 21, 1938. H. R. CRAGO 2,121,625
HEATING AND COOLING SYSTEM
Filed Nov. 17, 1936
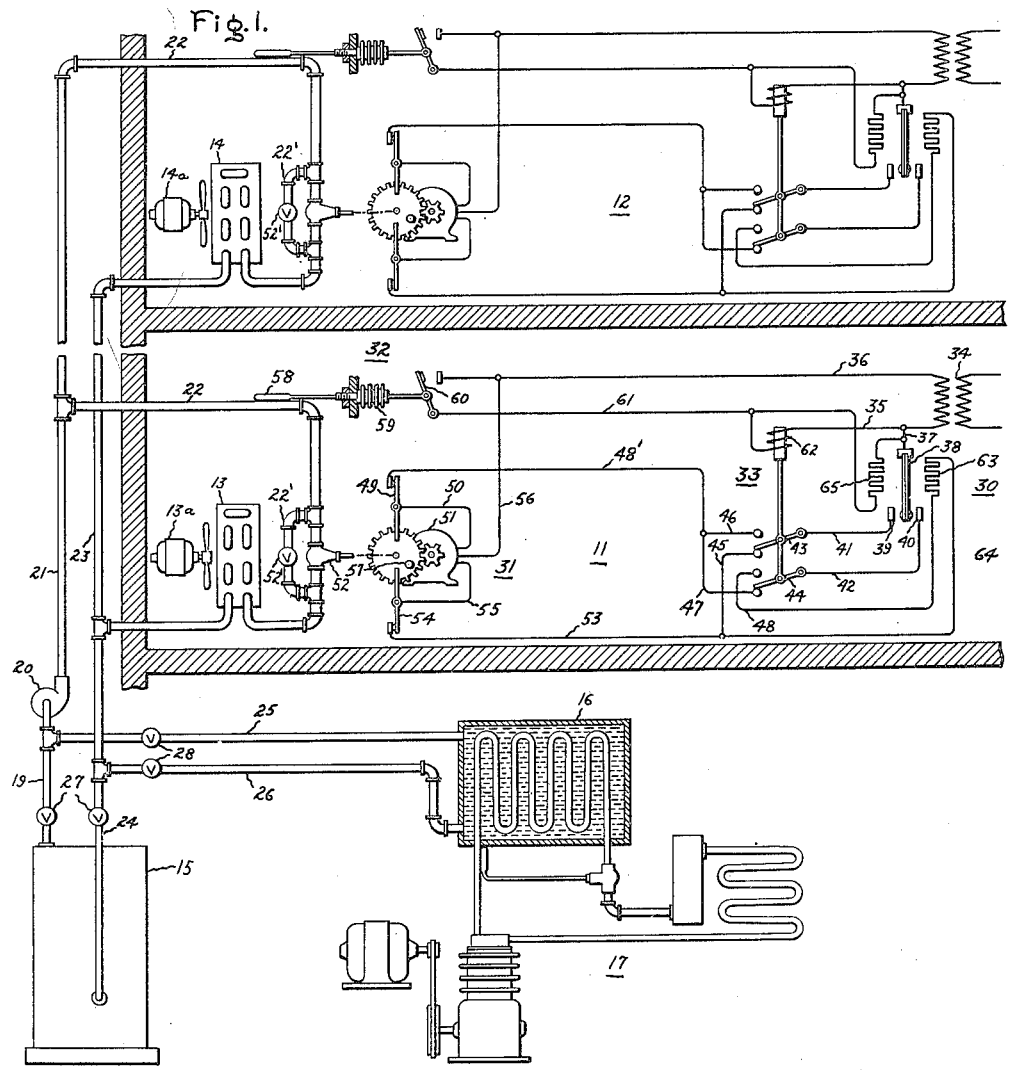
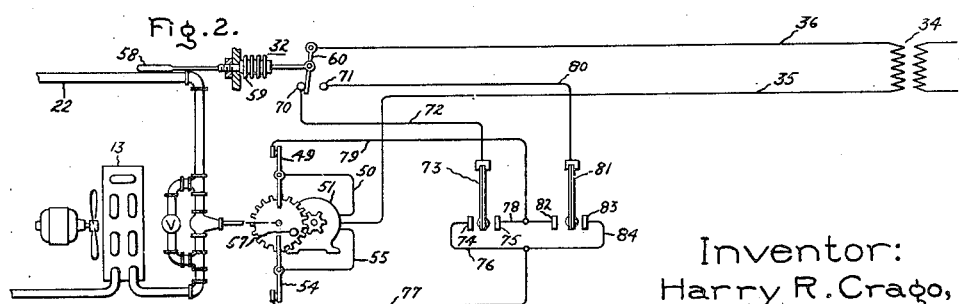
Inventor:
Harry R. Crago,
by Harry E. Dunham
His Attorney.

Patented June 21, 1938

2,121,625

UNITED STATES PATENT OFFICE 2,121,625

HEATING AND COOLING SYSTEM

Harry R. Crago, Caldwell, N. J., assignor to General Electric Company, a corporation of New York Application November 17, 1936, Serial No. 111,208

15 Claims. (Cl. 236—1)

My invention relates to an improved heating and cooling system and more particularly to a system of the type utilizing a single heat exchanger for both heating and cooling.

It has been found from experience that it is advantageous for reasons of efficiency and economy to utilize the same heat exchanger element for both heating and cooling an enclosure. This is true particularly with respect to existing structures already furnished with heat exchangers and conduits leading thereto from a central source of heat exchange medium, such as water, brine, or air.

In the past these installations have been manually controlled for the most part. Whenever a change from heating to cooling or vice versa was desirable, it was necessary to manually operate valves to change over from one medium to the other and manually operate reversing switches to reverse with respect to temperature the action of the thermal responsive controlling means on the medium flow regulating means. In some installations the action of the thermal responsive means over the flow regulating means has been reversed by thermal responsive means located in some central portion of the structure whose temperature is a mean of the entire structure. Such an arrangement is disclosed and claimed in the pending application of Edward A. Bailey, application Serial No. 70,100, filed March 21, 1936, and assigned to the assignee of the present application.

It is a primary object of my invention to provide an improved air conditioning system with individual thermal responsive control means in each enclosure in which the reversal of the action of the thermal control means with respect to the flow regulating means is accomplished by means responsive to the temperature of the medium supplied to the enclosure.

It is known to those skilled in the art that it is desirable to maintain a lower temperature during winter than during summer. Usually a temperature of approximately 70° F. is maintained in winter whereas a temperature of approximately 85° F. is maintained in summer. It is desirable also, because of the time lag in most heating systems and resultant overshooting in room temperatures, to provide a system with an anticipating thermal control during those periods when the heating system is in operation. These systems, as more fully explained in Letters Patent 1,583,496 granted May 4, 1926, to Walter L. Shafer, utilize a local source of heat associated with the thermal responsive means and energized thereby on a call for heat to vary the time of response of the device. The energization of the local source of heat on a call for heat by the thermal responsive means effects movement of the latter to its off position sometime prior to the time that the room reaches a predetermined temperature.

It is therefore another object of my invention to provide an improved system in which the above referred to reversing means is adapted both to vary the temperature at which the thermal responsive means responds and to provide an anticipating thermal control during those periods that heating is desired.

It is still another object of my invention to provide a control in which a single thermal responsive means performs all the functions outlined above whenever a change is made in the medium supplied to the enclosure.

A further object of my invention is to insure successful operation of the system at all times. In a system of the type under consideration there would be a gradual change in the temperature of the heat exchange medium from the temperature it possesses when leaving the central source to a temperature approximately that of the room whenever the flow of medium through the heat exchanger is stopped. If no means were provided to overcome this change in temperature of the heat exchange medium then, on termination of the supply thereof, the thermal responsive means would respond as though one of the two mediums were being supplied to the system. Whether this one be heating or cooling medium would depend on the calibration of the thermal responsive means subjected to the heat exchange medium and the temperature at which the structure is to be maintained. To overcome these difficulties I provide a by-pass around the flow regulating means so that even when the latter is in its closed position there is a flow of medium through the system.

Other objects and advantages of the invention will become apparent from the ensuing description taken in conjunction with the accompanying drawing in which is set forth for the purpose of illustration the details of arrangement.

Fig. 1 is a diagrammatic illustration, partially in section, of a system embodying the invention.

Fig. 2 illustrates diagrammatically a modified control system.

Referring to Fig. 1, reference figures 11 and 12 illustrate two enclosures, such as rooms forming part of a larger structure which may be a building or the like. The enclosures are provided with heat exchangers 13 and 14 through which either a heating or cooling medium may be passed to properly condition the enclosures. These may be provided with air circulating means 13a and 14a. By heating and cooling mediums I mean either separate mediums, such as steam and brine, or a single medium whose temperature has been either raised or lowered so as to heat or cool the structure. Heating medium is supplied from a suitable source illustrated diagrammatically as a furnace 15 of any conventional type and cooling medium is supplied from a storage tank 16 cooled by conventional cooling apparatus 17. The heating medium flows through a conduit 19 leading from the furnace to a circulating means, such as pump 20 of any suitable type, discharging into an inlet conduit or riser 21 leading through branch conduits 22 to heat exchangers 13 and 14. The medium returns to the furnace through a return conduit or riser 23 leading through a branch conduit 24 to the furnace 15.

The system is supplied with cooling medium through a pair of branch conduits 25 and 26 connecting the inlet and outlet risers 21 and 23 to the storage tank 16. Conduits 19 and 24 are provided with a pair of manually operated valves 27 adapted to be opened when it is desired to heat the structure and closed when cooling is desired. In similar fashion, conduits 25 and 26 are provided with a pair of manually operated valves 28 adapted to be closed when heating is desired and opened when cooling is desired.

The inlet conduits 22 are provided with suitable medium flow regulating means such as a motor operated valve 52 controlled in a manner to be described more fully hereinafter. A suitable bypass 22' is arranged around each valve so that medium will continuously flow past the hereinafter to be described thermal responsive means subject to the temperature of the medium. A manually operable valve 52' is placed in the bypass so that the flow therethrough may be cut off if desired.

It may be seen from an inspection of Fig. 1 that the controls for enclosures 11 and 12 are identical and for this reason the control for enclosure 11 only will be described. The enclosure is provided with thermal responsive means 30 adapted to maintain the enclosure temperature within predetermined limits by controlling the operation of a reversibly operable regulating means 31 adapted to control the flow of heat exchange medium through the heat exchanger 13. To reverse with respect to temperature the control of the thermal responsive means over the regulating means, I have provided a second thermal responsive means 32 actuated in response to the temperature of the medium supplied to the enclosure. Associated therewith is a reversing mechanism 33 that is effective to reverse the connections between the thermal responsive means 30 and the regulating means 31 in response to the action of the thermal responsive means 32. A more detailed description of the various above-mentioned control mechanisms will now be given.

The control is supplied with energy through a transformer 34 from the secondary of which there leads a pair of conductors 35 and 36. Conductor 35 is connected by conductor 37 to the thermal responsive element 38 of the thermal responsive means 30. Element 38 is illustrated as being of the well known bimetallic type and has associated therewith a pair of contacts 39 and 40 engageable thereby whenever the temperature within the enclosure varies beyond predetermined upper and lower limits, respectively. The contacts are connected by conductors 41 and 42 to switch arms 43 and 44, respectively, forming part of the reversing mechanism 33. Each of the latter has cooperatively associated therewith a pair of contacts from which lead conductors 45, 46 and 47, 48, respectively. Conductors 46 and 47 are in turn connected to a conductor 48' leading through a limit switch 49 and conductor 50 to one winding of a slow speed reversibly operable electric motor 51 connected through suitable gearing to a medium flow regulating valve 52 positioned in the conduit 22 leading to radiator 13. Conductor 45 is likewise connected by conductor 53 through a limit switch 54 and conductor 55 to the opposite winding of motor 51. The common terminal of the motor windings is connected by conductor 56 to conductor 36 leading to the source of power. Limit switch 49 is adapted to be opened by a switch operating arm 57 carried on the gearing when the valve 52 is operated to its fully closed position and limit switch 54 is adapted to be opened when the valve is operated to its fully open position.

The circuits just described are those through which the control is exerted when the enclosure is to be cooled at which time the thermal responsive means merely actuates the valve operating motor in opposite directions to variable control the flow of cooling medium to the radiator, as will be described more fully hereinafter.

Whenever heating medium is supplied to the enclosure the thermal fluid containing bulb 58 of the thermal responsive means 32 is heated and the expansion of the fluid therein and in the bellows 59 associated therewith forces the latter to the right to close switch 60. The latter is adapted to close a circuit connecting the previously mentioned conductor 36 and a conductor 61, which form an energizing circuit for reversing relay 62 forming part of the reversing mechanism 33. The armature of the latter is connected to switch arms 43 and 44 and whenever the relay is energized the switch arms are moved upwardly from their switch positions to reverse the control of the thermal responsive means over the regulating means 31, and simultaneously to change the control to an anticipating control and vary the temperature at which the thermal responsive means 30 operates.

The anticipating control is obtained by placing in heat conducting relation with the thermal responsive element 38 a first local source of heat, such as a resistor 63 connected to the previously mentioned conductors 48 and 53 through a conductor 64 so that it will be energized whenever the thermostat calls for additional heat. The variation in the temperature at which the thermal responsive means 30 operates is obtained by rendering effective a second local source of heat, illustrated as an electrical resistor 65 connected in parallel with the reversing relay 62 and energized simultaneously therewith. In describing the operation of the system resistor 63 will be called a preheat resistor and resistor 65 a subcalibrating resistor.

The operation of the system illustrated in Fig. 1 will now be described. Assuming first that the thermal responsive element 38 is calibrated to maintain a temperature of 85° F. when unaffected by local source of heat, as it would whenever cooling medium is supplied to the enclosure, the control is illustrated in the position it would have whenever cooling medium is supplied to the enclosure and the temperature within the enclosure is 85° F. At this time the bimetallic element 38 is intermediate the contacts 39 and 40 associated therewith but will engage contact 39 whenever the temperature increases above 85° F. and to engage contact 40 whenever the temperature decreases below 85° F. Assuming further that valves 27 have been closed and valves 28 opened to supply cooling medium to the radiators then, if the temperature within enclosure 11 increases above 85°, element 38 engages contact 39 thereby energizing motor 51 to operate the valve 52 toward its open position. The energizing circuit for the motor is as follows: from one side of the secondary winding of transformer 34 through conductor 37, thermal responsive element 38 in engagement with contact 39, conductor 41, switch arm 43 in engagement with conductor 45, conductor 53, limit switch 54 in its closed position, and conductor 55 to the opening winding of motor 51 and thence through conductors 56 and 36 back to the other side of the secondary winding of the transformer. Motor 51 is thereby energized and slowly opens valve 52. If the temperature within the enclosure decreases to a value of 85°, the bimetallic element 38 is moved out of engagement with contact 39 thereby deenergizing motor 51 and valve 52 remains in an intermediate open position. If the temperature again rises above 85° the motor is again energized to further open valve 52 and the operation will be repeated until the valve 52 is operated to its fully open position at which time limit switch 54 will be opened by action of switch-operating arm 57 carried on the gearing.

On a decrease in temperature below 85° the valve is operated toward its closed position in a manner similar to that described above with regard to the opening of the valve. The bimetallic element engages contact 40 and energizes the closing winding of the motor through the following circuit: from one side of the secondary transformer 34 through conductor 37, bimetallic element 38 in engagement with contact 40, conductor 42, switch arm 44 in engagement with conductor 47, conductor 48', limit switch 49 in its closed position, and conductor 50 to the closing winding of the valve operating motor and thence through conductors 56 and 36 back to the other side of the secondary winding of the transformer. The motor operates the valve slowly toward its closed position until such time as the bimetallic element moves out of engagement with contact 40. If thereafter the enclosure temperature decreases still further, the above described energizing circuit for motor 51 will be again energized to further close the valve. This operation will continue until the valve is in its fully closed position, at which time the limit switch 49 is opened by actuating arm 57.

A minimum circulation of the cooling medium through the radiator will take place through the by-pass 22' whenever the valve is operated to its fully closed position. In this manner I provide a continuous circulation of heat exchange medium past the bulb 58 of the thermal responsive means 32 and insure proper operation of the control system under all conditions.

Assuming now that outdoor temperatures change making it desirable to heat the structure. Valves 27 are opened and valves 28 closed and heating medium is supplied to the enclosures by pump 20. In response to the increased temperature of the heat exchange medium the volatile fluid in bulb 58 expands forcing bellows 59 outwardly and closing switch 60. Reversing relay 62 is energized thereby through the following circuit: from one side of the secondary winding of transformer 34 through conductor 35 leading to the relay 62 and thence through conductor 61, switch 60 now in its closed position and conductor 36 back to the other side of the transformer secondary winding. Energization of the reversing relay results in the upward movement of switch arms 43 and 44, the former being moved from engagement with conductor 45 into engagement with conductor 46 and the latter being moved from engagement with conductor 47 into engagement with conductor 48. It will be seen that this movement of the switch arms reverses with respect to temperature the control of the thermal responsive means over the regulating means because switch arm 43 is now in the circuit to the closing winding of motor 51 whereas it was formerly in the circuit with the opening winding and switch arm 44 is likewise in the opposite circuit.

Simultaneously with the energization of the reversing relay the subcalibrating resistor 65 is energized. It will be assumed that the resistor is so constructed and placed with respect to the thermostatic element that it will raise the temperature thereof 15°. The 15° rise is actually the creation of a false ambient around a thermostatic element so that it will now maintain a temperature of 85° minus 15° or 70° within the enclosure. Accordingly, the thermal responsive element will now move into engagement with contact 39 whenever the temperature increases above 70° and into engagement with contact 40 whenever the temperature decreases below 70°.

The anticipating control is also rendered effective by the energization of preheat resistor 63 whenever the thermal responsive means 30 calls for additional heat. Assuming first that the temperature within the space decreases below 70°, then the thermal responsive means closes a circuit energizing the opening winding of the valve operating motor 51 and the preheat resistor 63. The circuit leads from one side of the secondary winding of the transformer through conductor 37, bimetallic element 38 in engagement with contact 40, conductor 42, switch arm 44 in engagement with conductor 48, preheat resistor 63, conductors 64 and 53, limit switch 54 in its closed position, and conductor 55 to the opening winding of motor 51 and thence through conductors 56 and 36 back to the secondary winding of the transformer. The motor is thereby energized and moves the valve 52 slowly toward its open position. At the same time the preheat coil 63 is energized to locally heat the bimetallic element 38. If the total heat supplied to the bimetallic element by the heating medium and preheat resistor is sufficient to raise the temperature of the latter to 70° it will move out of engagement with contact 40, thereby deenergizing the preheat resistor and valve operating motor. Because of the effect of the resistor, this may occur some time prior to the time that the temperature of the enclosure is above 70°. In this event the bimetallic element will again engage contact 40 and again energize the preheat resistor and motor to further open the valve 52. After a series of intermittent valve opening movements the room temperature will finally reach a value of 70° whereupon the valve will be maintained at some fixed position. If the outside temperature is low enough the valve will be operated to its fully open position, at which time limit switch 54 will be opened in a previously described manner. Operation of the valve to its open position in a series of slow intermittent movements permits a closer regulation of temperatures and also prevents overshooting and undershooting.

Assuming that outside conditions moderate and the temperature within the enclosure rises above 70°, then bimetallic element 38 will engage contact 39 closing an energizing circuit for the valve closing winding of the motor. This circuit is as follows: from one side of the secondary winding of the transformer through conductor 37, bimetallic element 38 in engagement with contact 39, conductor 41, switch arm 43 in engagement with conductor 46, conductor 48′, limit switch 49 in its closed position, and conductor 50 to the closing winding of the motor and thence through conductors 56 and 36 back to the secondary winding of the transformer. If the temperature of the enclosure thereafter decreases to a value of 70°, the motor will become deenergized and the valve will remain in some new position. If, on the other hand, the temperature again rises, the motor will be again energized to close the valve. This action will continue until the valve is fully closed at which time the limit switch will be opened in the previously described manner.

When the valve is in its fully closed position, a limited amount of heating medium will flow through the by-pass insuring operation of the control system even though no heat is called for by the enclosure thermal responsive means for some time.

It will be obvious to those skilled in the art that my invention provides a simple arrangement whereby the controls in the various enclosures of a structure are independently changed to provide proper temperatures and control in response to change-over of the system from heating to cooling and vice versa. My invention obviates the necessity of connecting the individual room controls to a master control and thus effects a considerable saving in cost of wiring.

In Fig. 2, I have disclosed a modified form of control whereby somewhat the same results may be obtained. In this figure I have disclosed an arrangement in which the thermal responsive means subject to the temperature of the medium supplied to the enclosure is adapted to select one thermostat for cooling control and a second thermostat for heating control. The above-mentioned thermal responsive means is exactly the same in construction as that disclosed in Fig. 1. The control is supplied with energy from the source 34 through conductors 35 and 36, conductor 35 leading to the common terminal of the valve operating motor 51 and conductor 36 leading to switch 60. Associated with the latter are a pair of contacts 70 and 71, the switch 60 being shown in engagement with contact 70 which is the position obtaining when cooling medium is supplied to the radiator 13. Contact 70 is connected by conductor 72 to the thermal responsive element 73 exerting control when cooling medium is supplied to the enclosure. The latter is arranged to move to the left on an increase in temperature and to the right on a decrease in temperature and thereupon to engage contacts 74 and 75, respectively. Contact 74 is connected by conductor 76 to conductor 77 and thence through limit switch 54 and conductor 55 to the opening winding of the motor. Contact 75 is connected by conductors 78 and 79 to the limit switch 49 and thence through conductor 50 to the closing winding on the motor 51.

When heating medium is supplied to the heat exchanger, switch 60 engages the contact 71 connected by conductor 80 to a thermal responsive element 81 which exerts control whenever heating medium is supplied to the enclosure. This element is adapted to move in a manner similar to thermal responsive element 73 and therefore engages contact 82 on an increase in temperature and contact 83 on a decrease in temperature. Contact 82 is connected to conductor 78 and thence through a previously described circuit to the closing winding of the motor and conductor 83 is connected by conductor 84 to the conductor 77 and thence through a previously described circuit of the motor winding.

Assuming that the thermal responsive means 73 is adjusted to maintain a temperature of 85° within the enclosure and thermal responsive element 81 to maintain a temperature of 70° then, with cooling medium supplied to the enclosure the operation will be as follows: On an increase in temperature above 85° bimetallic element 73 will engage contact 74 thereby energizing the opening winding of motor 51. The circuit is as follows: from one side of the transformer secondary winding through conductor 36, switch 60 in engagement with contact 70, conductor 72, thermal responsive element 73 in engagement with contact 74, conductors 76 and 77, limit switch 54, and conductor 55 to the opening winding and thence through conductor 35 back to the secondary winding of the transformer. Motor 51 is thereby energized to operate the valve slowly toward its open position in a manner that should be obvious from the preceding description. Likewise, on a decrease in temperature below 85° the thermal responsive element will engage contact 75 to energize the closing winding of the motor 51. This circuit is as follows: from one side of the secondary winding of the transformer through conductor 36, switch 60 in engagement with contact 70, conductor 72, element 73 in engagement with contact 75, conductors 78 and 79, limit switch 49, and conductor 50 to the closing winding of the motor and thence back to the secondary winding of the transformer through conductor 35.

Whenever valves 27 and 28 are operated to change over from cooling to heating switch 60 is actuated into engagement with contact 71 thereupon placing thermal responsive element 81 in control of the flow regulating means. Having assumed that this element will maintain the temperature of the enclosure at 70° then whenever the temperature decreases below this value the valve motor will be energized to operate the valve toward its open position. The energizing circuit for the motor leads from one side of the secondary winding of the transformer through conductor 36, switch 60 in engagement with contact 71, conductor 80, thermal responsive element 81 in engagement with contact 83 and thence through conductor 84 to conductor 77 of the previously described opening circuit. In similar manner whenever the temperature within the enclosure rises above 70° thermal responsive element 81 engages contact 82 to close an energizing circuit for the closing winding of the valve operating motor. This circuit will be obvious from the above description and will not be repeated here.

It will be seen from the above description of operation that I have provided a number of arrangements in which it is necessary only to change over from heating to cooling or vice versa and the control will automatically respond to exert a proper control function.

What I claim as new and desire to secure by Letters Patent of the United States is:

1. In combination, electrical regulating means for controlling the flow of both heating and cooling medium to an enclosure, means including thermal responsive switching means and electric circuit connections controllable thereby for controlling said regulating means in response to temperature variations within said enclosure, and means responsive to the difference in temperature of said heating and cooling medium additionally controlling said circuit connections for reversing the control of said thermal responsive means over said regulating means.

2. In combination, a plurality of enclosures and heat exchangers in each enclosure having a common source of heating medium and a common source of cooling medium, separate regulating means associated with each heat exchanger for controlling the flow of both heating and cooling medium thereto, thermal responsive means in each enclosure for controlling said regulating means in response to temperature variations within the respective enclosures, means responsive to the difference in temperature of the medium supplied to said heat exchangers for reversing with respect to temperature the action of said thermal responsive means over said regulating means.

3. In combination, a source of heating medium, a source of cooling medium, a heat exchanger for an enclosure having means for selectively supplying said mediums thereto, regulating means for controlling the flow of the selected medium, means including thermal responsive means controlling said regulating means to effect an increased supply of cooling medium on an increase in temperature in said enclosure, and vice versa, when cooling means is supplied to said enclosure, and means including a second thermal responsive means for reversing with respect to temperature the action of said first thermal responsive means over said regulating means when heating medium is supplied to said heat exchange.

4. In combination, regulating means for controlling the flow of heat exchange medium having different temperatures, thermal responsive means for controlling said regulating means, means responsive to a predetermined difference in temperature of said medium for reversing with respect to temperature the action of said thermal responsive means over said regulating means, and means for maintaining a predetermined minimum flow of said medium over said last mentioned means.

5. In combination, a plurality of enclosures and heat exchangers in each enclosure having a common source of heating medium and a common source of cooling medium, a separate regulating means for controlling the flow of both heating and cooling medium to each of said heat exchangers, thermal responsive means in each enclosure for controlling said regulating means in response to temperature variations in the respective enclosures, means associated with each heat exchanger to be responsive to the difference in temperature of the medium supplied to the respective heat exchanger for reversing with respect to temperature the action of said thermal responsive means over said regulating means, and means for maintaining a predetermined minimum flow of said medium to each of said heat exchangers.

6. In combination, a heat exchanger for an enclosure having regulating means for controlling the flow of heat exchange medium thereto, thermal responsive means for controlling said regulating means in response to temperature requirements within said enclosure, means responsive to a predetermined difference in temperature of said medium for reversing with respect to temperature the action of said thermal responsive means over said regulating means, and means for maintaining a predetermined minimum flow of said medium to said heat exchanger irrespective of temperature requirements within said enclosure.

7. In combination, an enclosure provided with a heat exchanger, a source of cooling medium, a source of heating medium, means for selectively supplying said mediums to said heat exchanger, regulating means operable between fully closed and open positions for controlling the flow of the selected medium to said heat exchanger, thermal responsive means for controlling said regulating means in response to temperature variations in said enclosure, means responsive to the temperature of the medium flowing to said heat exchanger for reversing with respect to temperature the action of said thermal responsive means over said regulating means, and means including a by-pass around said regulating means for maintaining a predetermined minimum flow of medium to said heat exchanger.

8. In combination, means for varying the temperature of a heat exchange medium, regulating means controlling the flow of said medium to a heat exchanger for an enclosure, thermal responsive means operable at a predetermined temperature for controlling said regulating means in response to temperature variations within said enclosure, and means responsive to a predetermined difference in temperature of said medium supplied to said heat exchanger for reversing with respect to temperature the action of said thermal responsive means over said regulating means and having means for concurrently changing the temperature at which said thermal responsive means operates.

9. In combination, a source of cooling medium, a source of heating medium, means for selectively supplying said mediums to an enclosure, regulating means controlling the flow of the medium selected to be supplied, means including a pair of thermal responsive devices operable at different temperatures and responding oppositely in response to like temperature changes adapted to control said regulating means, and means responsive to the difference in temperature of the heating and cooling medium supplied to said enclosure for selectively rendering said devices effective to control said regulating means.

10. In combination, a source of cooling medium, a source of heating medium, a heat exchanger for an enclosure having means for selectively supplying said mediums thereto, regulating means operable between closed and open positions for controlling the flow of said mediums, means including a first thermal responsive device adapted when rendered effective to operate said regulating means toward its open position on an increase in temperature and vice versa, means including a second thermal responsive device adapted when rendered effective to operate said regulating means toward its open position on a decrease in temperature and vice versa, and means responsive to the temperature of a predetermined difference in the medium for rendering said first mentioned thermal responsive means effective when cooling medium supplied to said heat exchanger is supplied to said enclosure and for rendering said second mentioned thermal responsive means effective when heating medium is supplied to said enclosure.

11. In combination, a source of supply of cooling medium, a source of supply of heating medium, a heat exchanger for an enclosure having means for selectively supplying said mediums thereto, regulating means controlling the supply of said medium to said heat exchanger, thermally responsive means located within said enclosure and operable at a predetermined temperature for controlling said regulating means, local heating means in heat conducting relationship with said thermal responsive means for changing the temperature at which said thermal responsive means operates to exert its control, and means responsive to the temperature of the medium supplied to said heat exchanger for reversing with respect to temperature the control of said thermal responsive means over said regulating means and controlling said heating means.

12. In combination, a source of supply of cooling medium, a source of supply of heating medium, a heat exchanger for an enclosure having means for selectively supplying said mediums thereto, regulating means operable between closed and open positions for controlling the flow of the medium selected to said heat exchanger, means including thermal responsive means within said enclosure and electric circuit connections between said thermal responsive means and said regulating means for operating the latter toward its open position on an increase in temperature and vice versa, means for reversing said circuit connections whereby said regulating means will be operated toward its open position on a decrease in temperature and vice versa, local heating means associated with said thermal responsive means and adapted when energized to decrease the enclosure temperature at which said thermal responsive means responds, second local heating means associated with said thermal responsive means and controlled thereby adapted when energized to change the time of response of said thermal responsive means, and means responsive to the temperature of the medium supplied to said heat exchanger for controlling said reversing means, the energization of said first mentioned local heating means and for placing said second mentioned local heating means under the control of said thermal responsive means.

13. In a conditioning system employing heating and cooling mediums, the combination including medium flow regulating means, thermal responsive means calibrated to operate at a predetermined temperature for controlling said regulating means, means for reversing with respect to temperature the control of said thermal responsive means over said regulating means, means for subcalibrating said thermostat, a source of preheat for and controlled by said thermal responsive means, and means responsive to the temperature of the medium for controlling said reversing means, said means also rendering said subcalibrating means effective and placing said source of preheat under control of said thermal responsive means when heating medium is supplied to said zone.

14. The combination of reversibly operable electrical regulating means for controlling the flow of heat exchange medium to an enclosure, a source of electrical energy, thermal responsive means adapted to move to a first position to energize said first mentioned means for operating it in one direction and to a second position to operate it in an opposite direction, switching means between said thermal responsive means and regulating means for reversing with respect to temperature the action of said thermal responsive means over said regulating means, an electrical heater in heat conducting relationship with said thermal responsive means and adapted to be energized thereby when said reversing means is in a predetermined position, a second electrical heating means associated with said thermal responsive means, and means including a thermal responsive device actuated in response to the temperature of the medium supplied to said enclosure for operating said reversing means and energizing said second mentioned heating means.

15. In combination, a source of supply of cooling medium, a source of supply of heating medium, a heat exchanger for an enclosure having means for selectively supplying said mediums thereto, regulating means controlling the supply of said mediums to said heat exchanger, thermal responsive means located within said enclosure and operable at a predetermined temperature for controlling said regulating means, local heating means associated with said thermal responsive means and adapted when energized to change the time of response of said thermal responsive means, and temperature responsive means responsive to the difference in temperature of the mediums supplied to said heat exchanger for reversing with respect to temperature the control of said first thermal responsive means over said regulating means and for placing said local heating means under the control of said first thermal responsive means only when heating medium is supplied to said heat exchanger.

HARRY R. CRAGO.